United States Patent
Kondogiani

(10) Patent No.: US 11,631,875 B2
(45) Date of Patent: Apr. 18, 2023

(54) FUEL OXIDATION SYSTEM FOR PRESSURE VESSELS

(71) Applicant: Noble Gas Systems, Inc., Novi, MI (US)

(72) Inventor: Christopher T. Kondogiani, Novi, MI (US)

(73) Assignee: Noble Gas Systems, Inc., Novi, MI (US)

( * ) Notice: Subject to any disclaimer, the term of this patent is extended or adjusted under 35 U.S.C. 154(b) by 494 days.

(21) Appl. No.: 16/720,162

(22) Filed: Dec. 19, 2019

(65) Prior Publication Data

US 2020/0203744 A1  Jun. 25, 2020

Related U.S. Application Data

(60) Provisional application No. 62/783,608, filed on Dec. 21, 2018.

(51) Int. Cl.
| | |
|---|---|
| H01M 4/02 | (2006.01) |
| H01M 8/1007 | (2016.01) |
| C25B 1/00 | (2021.01) |
| C25B 1/30 | (2006.01) |
| C25B 15/08 | (2006.01) |
| H01M 8/04082 | (2016.01) |
| B01D 53/22 | (2006.01) |
| C25B 9/19 | (2021.01) |
| H01M 8/10 | (2016.01) |

(52) U.S. Cl.
CPC ........ H01M 8/1007 (2016.02); B01D 53/229 (2013.01); C25B 1/00 (2013.01); C25B 1/30 (2013.01); C25B 9/19 (2021.01); C25B 15/08 (2013.01); H01M 8/04201 (2013.01); *H01M 2008/1095* (2013.01)

(58) Field of Classification Search
CPC ..................................................... H01M 4/02
See application file for complete search history.

(56) References Cited

U.S. PATENT DOCUMENTS

| | | | | |
|---|---|---|---|---|
| 9,850,852 | B2 | 12/2017 | Kondogiani et al. | |
| 2014/0356761 | A1* | 12/2014 | Gibbs | H01M 4/926 429/525 |
| 2015/0111120 | A1* | 4/2015 | Eickhoff | H01M 8/04216 422/187 |
| 2016/0260987 | A1* | 9/2016 | Watanabe | H01M 8/2465 |
| 2017/0309937 | A1* | 10/2017 | Boudjemaa | H01M 8/04067 |

* cited by examiner

*Primary Examiner* — Jacob B Marks
(74) *Attorney, Agent, or Firm* — Young Basile Hanlon & MacFarlane, P.C.

(57) ABSTRACT

A fuel oxidation system including an inlet in fluid communication with an interior of a sealed container, and the sealed container is holding permeated gas released from a pressure vessel within the sealed container. Another inlet is in fluid communication with an environment surrounding the sealed container, and the environment includes oxygen gas ($O_2$). An oxidation module is in fluid communication with the inlet and the other inlet, and the oxidation module is combining the permeated gas received by the inlet with the oxygen gas ($O_2$) received by the other inlet to form a preferred substance.

14 Claims, 3 Drawing Sheets

US 11,631,875 B2

FUEL OXIDATION SYSTEM FOR PRESSURE VESSELS

CROSS-REFERENCE TO RELATED APPLICATIONS

This application claims priority to U.S. Provisional Patent Application Ser. No. 62/783,608, titled "Fuel Oxidation System for Pressure Vessels," filed Dec. 21, 2018, the entirety of which is incorporated herein.

TECHNICAL FIELD

This disclosure relates to management of contained permeated gas released from pressure vessels and/or fuel cylinders.

BACKGROUND

Pressure vessels and fuel cylinders, which are used to store many different gaseous substances, are subject to permeation limits imposed by regulatory organizations. Permeation is also subject to limits related to market acceptance in commercial markets. At high pressures, stored gas can permeate through walls of the pressure vessels or fuel cylinders, particularly pressure vessels with polymeric liners. Pressure vessels of the type shown and described in related U.S. patent application Ser. No. 15/209,335, filed Jul. 13, 2016, now U.S. Pat. No. 9,850,852, incorporated by reference in its entirety, can be stored in an outer shell, container, or cabinet that can contain gas that permeates out of the pressure vessels.

In some vehicular applications, such as fuel-cell engine applications, the amount of hydrogen gas that permeates a pressure vessel located within a broader vehicular fuel system may exceed the amount of hydrogen gas that can be consumed while the vehicle including the fuel system is parked. Excess hydrogen gas could cause a pressure increase in an outer shell of a pressure vessel or fuel cylinder that exceeds a designed strength of the pressure vessel or fuel cylinder. Excess hydrogen gas could also permeate through the outer shell of the pressure vessel or fuel cylinder. Additionally, the permeability of some materials prevents them from being used in pressure vessels or fuel cylinders.

SUMMARY

A fuel oxidation system including an inlet in fluid communication with an interior of a sealed container, and the sealed container is holding permeated gas released from a pressure vessel within the sealed container. Another inlet is in fluid communication with an environment surrounding the sealed container, and the environment includes oxygen gas ($O_2$). An oxidation module is in fluid communication with the inlet and the other inlet, and the oxidation module is combining the permeated gas received by the inlet with the oxygen gas ($O_2$) received by the other inlet to form a preferred substance.

A fuel oxidation system includes an oxidation module defining an interior, and a valve or a membrane is configured to control fluid communication between an interior of a sealed container and the interior of the oxidation module. The interior of the sealed container is configured to hold permeated gas released from a pressure vessel, and a pump is configured to move oxygen gas ($O_2$) between an external environment surrounding the oxidation module and the interior of the oxidation module. A catalyst is disposed within the interior of the oxidation module and configured to promote combination of the oxygen gas ($O_2$) from the external environment and the permeated gas to form a preferred substance. A drain is in fluid communication with the interior of the oxidation module and the external environment, and the drain is configured to move the preferred substance from the interior of the oxidation module to the external environment.

A fuel oxidation system includes a fuel cell in fluid communication with an interior of a sealed container and an external environment, and the interior of the sealed container is holding permeated gas released from a pressure vessel. The fuel cell includes a membrane disposed between the interior of the sealed container and the external environment, and the fuel cell combines oxygen gas ($O_2$) from the external environment and the permeated gas from the interior of the sealed container to create a preferred substance.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Permeation is used broadly in this application to include both gas that penetrates through solid walls of the pressure vessel as well as gas that escapes, leaks, or seeps through cracks and openings at joints or edges of the pressure vessel. Gas that permeates from pressure vessels and fuel cylinders can be reused, re-pressurized, or recycled. For example, by incorporating a catalyst or a fuel cell to consume gas that escapes pressure vessels or other pressurized elements within a closed-container-based fuel system, permeated gas contained within a sealed container can be effectively managed before it is released into the atmosphere. The oxidation systems described here are configured to convert contained, permeated gases from pressure vessels or fuel cylinders to preferred substances such as water ($H_2O$), carbon dioxide ($CO_2$), hydrogen peroxide ($H_2O_2$), carbon monoxide (CO), or electricity. The preferred substance may be inert, unregulated, or less volatile relative to the permeated substance. The preferred substance may have a lower greenhouse potential than the permeated substance.

Figure 1:
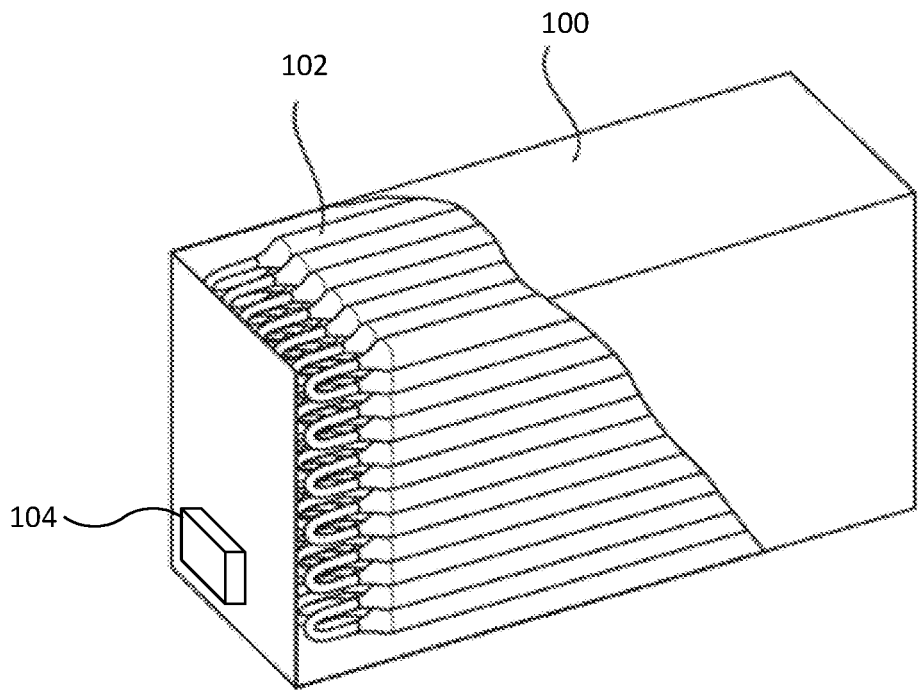
FIG. 1 is a perspective partial-cutaway view of a sealed container, a compressed gas pressure vessel, and an oxidation system.

FIG. 1 is a perspective partial-cutaway view of a sealed container 100, a compressed-gas pressure vessel 102, and an oxidation system 104.

The pressure vessel 102 can be a conformable tank comprised of a continuous chain of cylindrical, elongated, main vessel portions and alternating reduced diameter intermediate portions that allow the pressure vessel 102 to flex and bend to fit within a variety of container shapes, including the sealed container 100. The pressure vessel 102 includes a reinforced liner that contains high pressure gas. For example, the pressure vessel 102 shown in FIG. 1 can be configured for use in a 10,000 PSI fuel cell vehicle application or a 3,600 PSI natural gas vehicle application. In some embodiments, the pressure vessel 102 can include main vessel portions of varying shapes, such as ovoid shapes or spherical shapes. In some embodiments, the pressure vessel 102 can include a singular main vessel portion without flexible reduced diameter intermediate portions.

The sealed container 100, sometimes called an outer shell, is designed to capture gas that permeates from the pressure vessel 102 or other pressurized elements (not shown), creating a two-stage permeation barrier. When pressure vessels such as pressure vessel 102 are filled with high-pressure gas and are stored for a period of time, gas can permeate through the walls of the pressure vessel 102 and be further contained (e.g., at a relatively lower pressure) within walls of the outer shell or sealed container 100. As time passes, a pressure level within the sealed container 100 can increase until equalization with a pressure level within the pressure vessel 102 is achieved.

The sealed container 100 may further contain an inert gas. The inert gas may be carbon dioxide ($CO_2$), nitrogen gas ($N_2$), helium (He), argon (Ar), neon (Ne), krypton (Kr), xenon (Xe), and radon (Rn). Discussed below, permeated gases (e.g., $H_2$ and $CH_4$) are highly reactive, sometimes even explosively reactive, with oxygen gas ($O_2$). The inert gas may be included in the sealed container to provide desirable molar ratios of permeated gas and any impurities (e.g., $O_2$) in the sealed container 100. Further, the inert gas may provide desirable pressure equilibrium in the sealed container so that permeated gas may be utilized with the oxidation system 104. The pressure vessel 102 may be free of the inert gas. Where appropriate, the inert gas may be similar to atmospheric air.

The sealed container 100 can function as a vapor barrier that contains the compressed-gas pressure vessel 102 and blocks lower-pressure gas that permeates from the compressed-gas pressure vessel 102 from escaping into an environment surrounding the sealed container 100 (e.g., for a period of time). Eventually, as the pressure increases within the sealed container 100 due to permeation from the pressure vessel 102, further permeation from the sealed container 100 to the outside environment can occur.

It is possible to stop further permeation by designing the sealed container 100 with a thick, strong shell; however, this can be both cost and weight prohibitive for most vehicular applications. Thus, the sealed container 100 can be formed, for example, of construction materials similar to those used to form the pressure vessel 102, such as plastic materials of generally light weight. The sealed container 100 can also be formed, for example, of constructions materials that act as a barrier, such as composite or metallic materials.

The oxidation system 104 is shown in FIG. 1 as a box or extension disposed on a surface of the sealed container 100. Further release of permeated gas from the sealed container 100 is avoided by use of the oxidation system 104. The oxidation system 104 may be attached to an exterior of the sealed container 100 as shown, may be located on an interior of the sealed container 100 (not shown), or may be located in any other mechanical manner that allows fluid communication between the oxidation system 104 and an interior of the sealed container 100.

Figure 2:
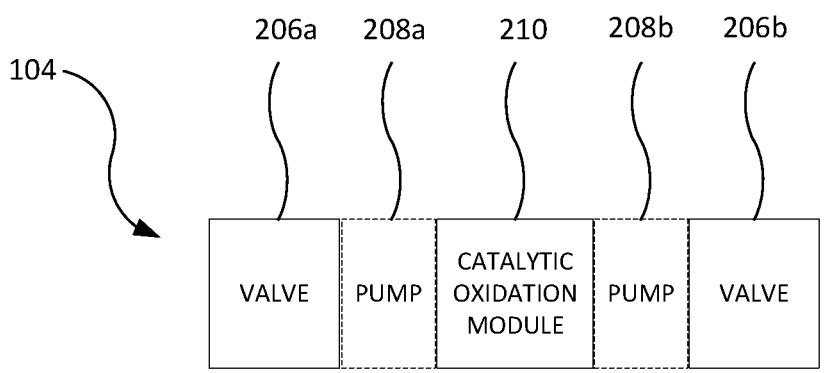
FIG. 2 is a schematic detail view of the oxidation system of FIG. 1.

FIG. 2 is a schematic detail view of the oxidation system 104 of FIG. 1. The oxidation system 104 allows permeated gas from the compressed-gas pressure vessel 102 to be converted to preferred substances through an electrochemical process such as oxidation, controlling the pressure and amount of permeated gas within the sealed container 100. The oxidation system 104 includes valves 206a, 206b, optional pumps 208a, 208b, and a catalytic oxidation module 210 to prevent excess buildup of permeated gas within the sealed container 100. The valve 206a and the optional pump 208a are examples of a first inlet to the oxidation system 104. The valve 206b and the optional pump 208b are examples of a second inlet to the oxidation system 104. Though the valves 206a, 206b and the pumps 208a, 208b are shown and described, other means of allowing gases to pass into the oxidation system 104 in a controlled manner are also possible.

Rising pressure within the sealed container 100 due to permeation from the pressure vessel 102 can force permeated gas through the valve 206a into the oxidation system 104. Both the valve 206a and other valves described in this application can be, for example, check valves, permeable membranes, or other interface types that are configured to keep gases separated on opposite sides until a threshold pressure level is reached on one side or a passageway is opened between the sides. In some embodiments, the permeated gas can be drawn or forced through the valve 206a by the optional pump 208a (or another vacuum-based system).

The oxidation system 104 can include another valve 206b that draws oxygen gas ($O_2$) or another reactant from an environment outside the sealed container 100 into the oxidation system 104. The oxidation system 104 may draw oxygen gas ($O_2$), or another reactant, from a tank (not shown) into the oxidation system 104. In some embodiments, the oxygen gas ($O_2$) can be drawn or forced through the valve 206b by the optional pump 208b (or another vacuum-based system).

In one example, the oxidation system 104 can use pressure forces to move preferred substances outside of the sealed container 100. The sealed container 100 can include a valve 206a in fluid communication with the oxidation system 104; a pump 208b configured to move fluids between the external environment and the inside of the oxidation system 104; and a drain (not shown) configured to release preferred substance from the oxidation system 104 to the external environment. The pressure of the pressure vessel 102 may be greater than the inside of the sealed container 100. The pressure of the inside of the sealed container 100 may be greater than the pressure of the inside of the oxidation system 104. The pressure of the inside of the oxidation system 104 may be greater than the pressure of the external environment so that fluid flow is pushed from the inside of the oxidation system 104 to the external environment.

The catalytic oxidation module 210 allows the collected permeated gas to be combined with the collected oxygen gas ($O_2$) from the surrounding environment without cross-contamination (i.e., oxygen gas ($O_2$) from the surrounding environment does not enter the sealed container 100, and permeated gas from the sealed container 100 does not enter the surrounding environment).

The catalytic oxidation module 210 generates a preferred substance by oxidizing the permeated gas using a catalyst and a chemical reaction, combining the permeated gas with oxygen gas ($O_2$) from the atmosphere collected from outside the sealed container 100. In an example where the permeated gas is hydrogen ($H_2$), the catalytic oxidation module 210 combines the permeated hydrogen ($H_2$) with oxygen gas ($O_2$) using a catalyst to form water ($H_2O$) or hydrogen peroxide ($H_2O_2$). In an example where the permeated gas is methane ($CH_4$), the catalytic oxidation module 210 combines the permeated methane ($CH_4$) with oxygen gas ($O_2$) using a catalyst to form water ($H_2O$), carbon monoxide (CO), or carbon dioxide ($CO_2$). Water ($H_2O$), carbon monoxide (CO), hydrogen peroxide ($H_2O_2$) and/or carbon dioxide ($CO_2$) can be released into the surrounding environment by the oxidation system 104, for example, using a drain or additional valve (not shown).

In one example, the catalyst is a granular catalyst formed of a metallic coating of fine particles of a ceramic, carbon, or plastic substrate. The coating creates a large surface area that fills the volume of the catalytic oxidation module 210 to promote the catalyst-assisted reaction. In another example, the catalyst is a metallic substance, such as palladium (Pd), platinum (Pt), nickel (Ni), silver (Ag), copper (Cu), or gold (Au), iron (Fe), cobalt (Co), rhenium (Rh), or ruthenium (Ru), that promotes the chemical reaction. The chemical reaction is promoted, for example, when the permeated gas (e.g., $H_2$ or $CH_4$) is consumed during the chemical reaction without combustion.

In another example, the oxidation system 104 includes a resistive element (not shown), and the resistive element may be used with or without another catalyst to assist with producing the preferred substance. For example, the resistive element may form the preferred substance in place of another catalyst. The resistive element may assist with producing the preferred substance by supplying electricity or energy to the oxidation system 104 via a battery, solar panel, automobile engine, energy source, or any other permanent power source. The resistive element may be a sensor or simple resistor for supplying a source of energy to promote the oxidation carried out by another catalyst between the hydrogen ($H_2$), methane ($CH_4$), or oxygen ($H_2$) to form the preferred substance.

In some examples of the oxidation system 104, no pumps 208a, 208b are required, and in some examples, only one pump (e.g., pump 208a) is required. Use of the pumps 208a, 208b depends on gas pressures, types of gas, and types of membranes or valves 206a, 206b that control movement of gases into the oxidation system 104. The optional pumps 208a, 208b can also be located on either side (e.g., upstream or downstream) of the associated valves 206a, 206b.

Figure 3:
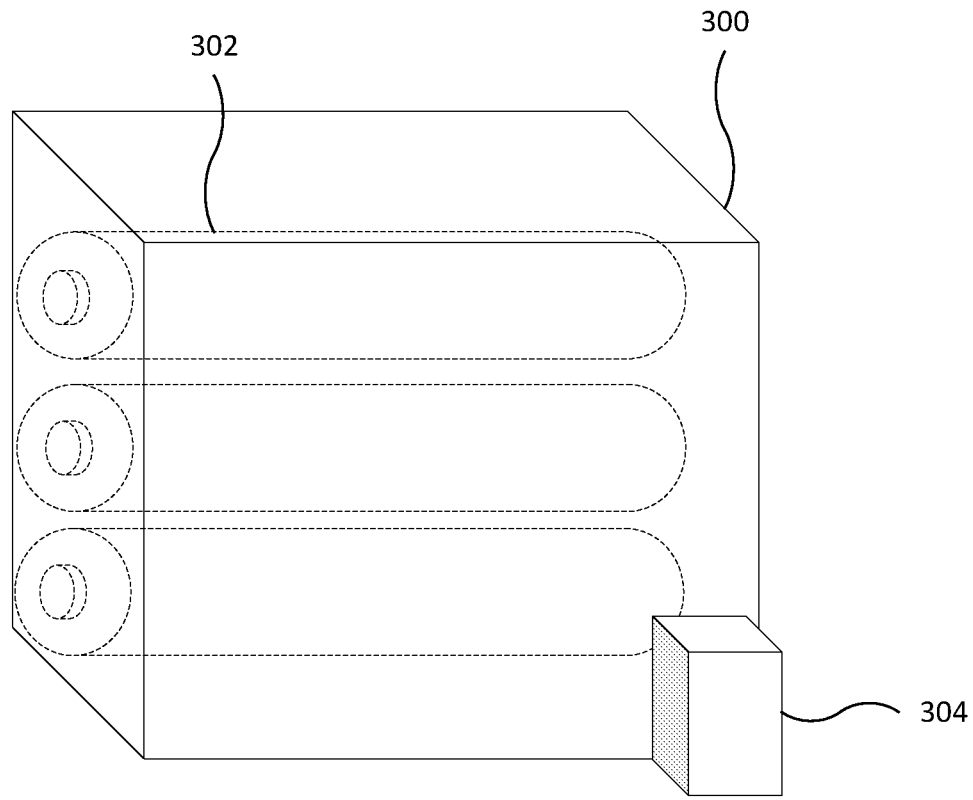
FIG. 3 is a perspective partial-hidden view of a sealed cabinet, fuel cylinders, and an oxidation system.

FIG. 3 is a perspective partial-hidden view of a sealed cabinet 300, fuel cylinders 302 (in dotted line, designated as hidden within the sealed cabinet 300), and an oxidation system 304. The fuel cylinders 302 of FIG. 3 are similar to the pressure vessel 102 of FIG. 1 in that pressurized gas is stored for use as a fuel by the fuel cylinders 302. The sealed cabinet 300 of FIG. 3 is similar to the sealed container 100 of FIG. 1 in that the sealed cabinet 300 holds pressurized vessels (here, fuel cylinders 302) to protect a surrounding environment from permeated gas escaping the pressurized vessels. The size and construction of the fuel cylinders 302 and sealed cabinet 300 may differ from that of the pressure vessel 102 and sealed container 100 of FIG. 1, though containment of permeated gas is similar in nature.

For example, the fuel cylinders 302 can be standard, type IV, hoop wound cylinders. The sealed cabinet 300 can be formed of metallic materials, for example, bent, welded, and fastened together, and can include an inner liner or surface treatment to hold permeated gas from the fuel cylinders 302 for a period of time. Eventually, as the pressure increases within the sealed cabinet 300 due to permeation from the fuel cylinders 302, further permeation from the sealed cabinet 300 the outside environment can occur. This is avoided by use of the oxidation system 304.

Like the oxidation system 104 of FIGS. 1 and 2, the oxidation system 304 of FIG. 3 may be attached to an exterior of the sealed container 300 as shown, may be located on an interior of the sealed container 300 (not shown), or may be located in any other mechanical manner that allows fluid communication between the oxidation system 304 and an interior of the sealed container 300.

Figure 4:
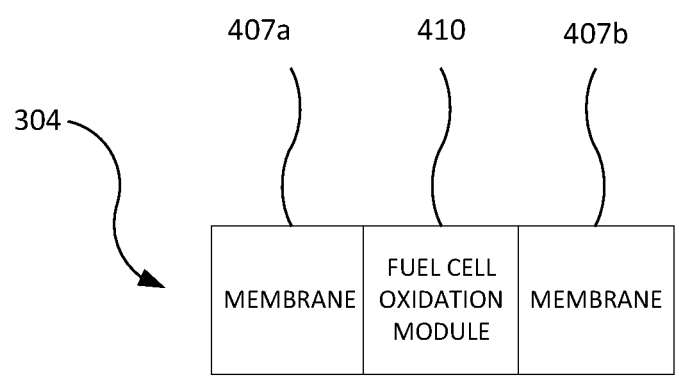
FIG. 4 is a schematic detail view of the oxidation system of FIG. 3.

FIG. 4 is a schematic detail view of the oxidation system 304 of FIG. 3. The oxidation system 304 allows permeated gas from the fuel cylinders 302 to be converted to preferred substances through use of a fuel cell, controlling the pressure and amount of permeated gas within the sealed cabinet 300. The oxidation system 304 includes membranes 407a, 407b (e.g., semi-permeable or selectively-permeable membranes) and a fuel-cell oxidation module 410 to prevent excess buildup of permeated gas within the sealed cabinet 300. Rising pressure within the sealed cabinet 300 of FIG. 3 due to permeation from the fuel cylinders 302 can force permeated gas through the membrane 407a into the oxidation system 304. In one example, an electrical load may be applied to a surface of the membrane 407a to ionize the permeated gas and permit a flow of protons through the membrane 407a. The oxidation system 304 can also include another membrane 407b that allows oxygen gas ($O_2$) from an environment outside the sealed cabinet 300 into the oxidation system 304.

The fuel-cell oxidation module 410 allows the collected permeated gas to be combined with the collected oxygen gas ($O_2$) from the surrounding environment without cross-contamination (i.e., oxygen gas ($O_2$) from the surrounding environment does not enter the sealed cabinet 300, and gas from the sealed cabinet 300 does not enter the surrounding environment).

The fuel-cell oxidation module 410 generates a preferred substance, neutralizing the permeated gas using a fuel cell to consume the permeated gas. In an example where the permeated gas is hydrogen ($H_2$), the fuel-cell oxidation module 410 combines the permeated hydrogen ($H_2$) with oxygen gas ($O_2$) to form water ($H_2O$) and electricity. Water ($H_2O$) can be released into the surrounding environment, for example, using a drain or valve (not shown), and electricity can be captured to supply power, for example, to other vehicular systems such as sensor systems or battery systems (not shown).

In one example, the fuel cell oxidation module 410 may include a polymer electrolyte membrane. The polymer electrolyte membrane, also known as a proton exchange membrane, may include an anode layer, a cathode layer, an electrolyte layer, a catalyst, and gas diffusion layers. Protons from hydrogen ($H_2$) are facilitated across the polymer electrolyte membrane to combine with oxygen gas ($O_2$) and form water ($H_2O$) that is released into an external environment. The anode layer is in fluid communication with the permeated gas (e.g., $H_2$) and contacts the electrolyte. The cathode is in fluid communication with the outside atmosphere (e.g., $O_2$) and contacts the electrolyte. The cathode also facilitates release of the preferred substance (e.g., $H_2O$) to the outside atmosphere. The catalyst thus promotes the combination of hydrogen ($H_2$) and oxygen ($O_2$). The gas diffusion layer diffuses the oxygen gas ($O_2$), the hydrogen ($H_2$), or the water ($H_2O$) across polymer electrolyte membrane. Furthermore, the cathode and the electrode can be configured to diffuse the oxygen gas ($O_2$), the hydrogen ($H_2$), or the water ($H_2O$) across polymer electrolyte membrane. The polymer electrolyte member may further be configured to capture electron energy (i.e., electricity) from the combination of any reactants described.

Figure 5:
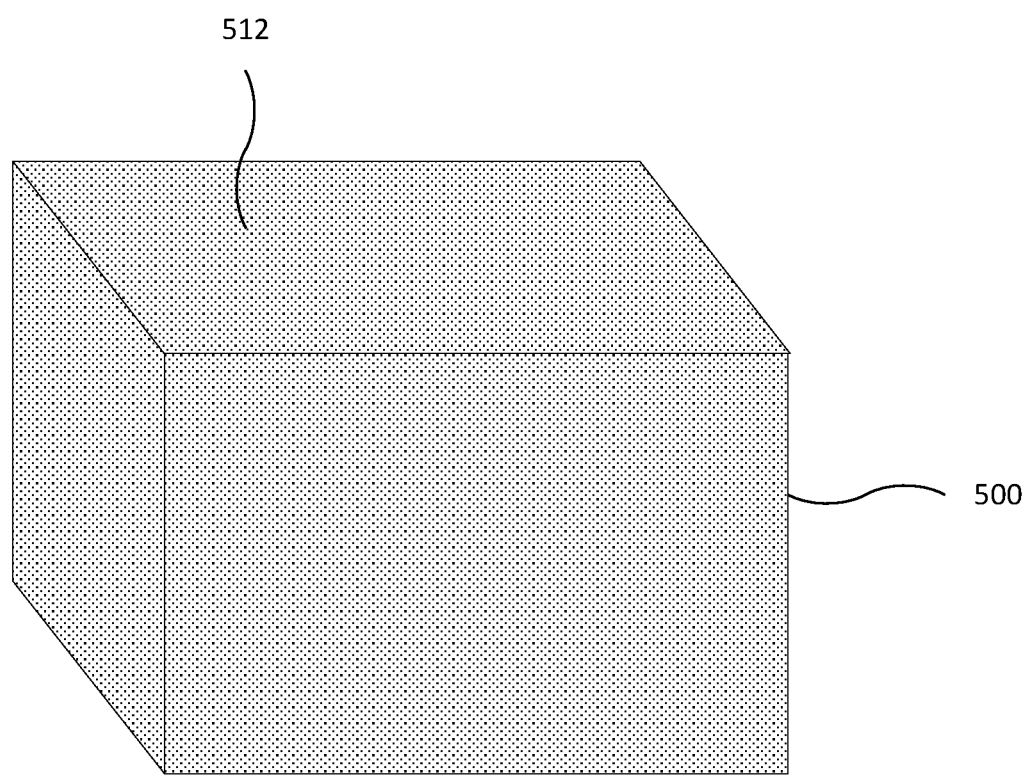
FIG. 5 is a perspective view of another sealed container.

FIG. 5 is a perspective view of another sealed container 500. Though not shown, the sealed container 500 can include a pressure vessel such as the pressure vessel 102 of FIG. 1 or fuel cylinders such as the fuel cylinders 302 of FIG. 3. The sealed container 500 can be designed to hold permeated gas from a pressure vessel or a fuel cylinder within its interior (not shown).

The sealed container 500 is formed from or includes a semi-permeable membrane 512 distributed over at least a portion of a surface of the sealed container 500. In the example of FIG. 3, three sides of the six-sided, rectangular-shaped sealed container 500 include the semi-permeable membrane 512 as denoted by the dotted pattern. Though three sides are shown, any number of sides or portions of sides may be formed from or include the semi-permeable membrane 512.

In one example, the semi-permeable membrane 512 may include a polymer electrolyte membrane that has an anode layer, a cathode layer, an electrolyte layer, a catalyst, and gas diffusion layers, similarly to the polymer electrolyte membrane of the fuel oxidation module 410 of FIG. 4.

In one example where the sealed container 500 holds permeated hydrogen ($H_2$), an electrical load can be applied to the sealed container 500 formed of the semi-permeable membrane 512, and the hydrogen ($H_2$) can be ionized, resulting in protons being permitted to pass through the semi-permeable membrane 512 to combine with oxygen gas ($O_2$) in the surrounding environment to form water ($H_2O$), a preferred substance.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A fuel oxidation system, comprising:
    a pressure vessel configured to contain a fuel gas under a pressure that is higher than ambient pressure;
    a sealed container that encloses the pressure vessel and includes an interior space, wherein the sealed container is configured to hold fuel gas that permeates from the pressure vessel into the interior space;
    an inlet in fluid communication with the interior space of the sealed container;
    another inlet in fluid communication with an environment surrounding the sealed container, the environment comprising oxygen gas ($O_2$); and
    an oxidation module in fluid communication with the inlet and the other inlet, the oxidation module combining the fuel gas received by the inlet with the oxygen gas ($O_2$) received by the other inlet to form a preferred substance.

2. The fuel oxidation system of claim 1, wherein the fuel gas comprises at least one of hydrogen ($H_2$) and methane ($CH_4$).

3. The fuel oxidation system of claim 1, wherein the preferred substance comprises at least one of water ($H_2O$), carbon dioxide ($CO_2$), carbon monoxide (CO), hydrogen peroxide ($H_2O_2$), or electricity.

4. The fuel oxidation system of claim 1, wherein the oxidation module comprises a catalyst that facilitates oxidation of the fuel gas.

5. The fuel oxidation system of claim 1, wherein the oxidation module comprises a fuel cell that consumes the fuel gas and the oxygen gas ($O_2$).

6. The fuel oxidation system of claim 1, wherein the inlet and the other inlet each comprise at least one of a check valve or a permeable membrane.

7. The fuel oxidation system of claim 1, wherein the interior of the sealed container holds an inert gas, comprising:
    at least one of carbon dioxide ($CO_2$), nitrogen gas ($N_2$), helium (He), argon (Ar), neon (Ne), krypton (Kr), xenon (Xe), or radon (Rn).

8. The fuel oxidation system of claim 1, wherein the inlet or the other inlet comprises a pump that controllably facilitates fluid movement between the external environment or the interior of the sealed container and the oxidation module.

9. The fuel oxidation system of claim 1, wherein the inlet and the other inlet are free of direct fluid communication.

10. The fuel oxidation system of claim 1, wherein the pressure vessel is configured to contain the fuel gas at a first pressure, wherein the sealed container is configured to contain the fuel gas at a second pressure, and wherein the first pressure is higher than the second pressure.

11. The fuel oxidation system of claim 1, wherein the sealed container is configured to vent fuel gas through the inlet and does not permeate fuel gas through walls of the sealed container when connected with the inlet.

12. The fuel oxidation system of claim 1, wherein the pressure vessel permeates the fuel gas to the sealed container due to the fuel gas being under a pressure sufficient to permeate the fuel gas across a liner.

13. The fuel oxidation system of claim 1, wherein the fuel gas of the pressure vessel is configured to have a higher pressure than the fuel gas of the sealed container due to the oxidation module being configured to:
    vent the fuel gas from the interior space at the inlet;
    convert the fuel gas to the preferred substance; and
    vent the preferred substance from the oxidation module to the external environment.

14. The fuel oxidation system of claim 1, wherein the pressure vessel comprises a liner that is configured to permeate gas under high pressure.

* * * * *